United States Patent [19]
Castricum

[11] Patent Number: 5,193,374
[45] Date of Patent: Mar. 16, 1993

[54] APPARATUS FOR CUTTING SPIRAL PIPE

[75] Inventor: Wilhelmus P. H. Castricum, Rolling Meadows, Ill.

[73] Assignee: Spiro America Inc., Buffalo Grove, Ill.

[21] Appl. No.: 658,056

[22] Filed: Feb. 20, 1991

[51] Int. Cl.⁵ .............................................. B21C 37/12
[52] U.S. Cl. ........................................ 72/49; 72/132; 83/185; 83/54
[58] Field of Search ...................... 72/49, 338, 50, 72, 72/70, 129, 132, 135; 83/185, 54, 186; 228/145; 82/53.1, 54, 56, 82, 92-94, 98, 101, 102

[56] References Cited

U.S. PATENT DOCUMENTS

| | | |
|---|---|---|
| 957,966 | 5/1910 | Jenkins . |
| 1,478,692 | 12/1923 | Baranoff ................................. 72/72 |
| 1,635,807 | 7/1927 | Amberg ................................. 82/54 |
| 2,749,983 | 6/1956 | Rogers ................................... 82/93 |
| 3,268,137 | 8/1966 | Martin . |
| 3,839,931 | 10/1974 | Herpich ................................. 82/54 |
| 3,839,933 | 10/1974 | Paramoroff ........................... 82/82 |
| 3,913,430 | 10/1975 | van Dijk . |
| 4,706,481 | 11/1987 | Castricum . |
| 4,823,579 | 4/1989 | Castricum ............................. 72/49 |
| 4,924,684 | 5/1990 | Castricum ............................. 72/49 |
| 4,924,684 | 5/1990 | Castricum . |

FOREIGN PATENT DOCUMENTS

| | | |
|---|---|---|
| 0353622 | 2/1990 | European Pat. Off. . |
| 1602503 | 12/1970 | Fed. Rep. of Germany ........ 83/185 |
| 2218963 | 9/1974 | France . |
| 1555114 | 11/1979 | United Kingdom ................... 83/185 |

Primary Examiner—Lowell A. Larson
Assistant Examiner—Michael J. McKeon
Attorney, Agent, or Firm—Willian Brinks Olds Hofer Gilson & Lione

[57] ABSTRACT

An apparatus for cutting spirally formed pipe is disclosed. The pipe cutting apparatus has an inner knife positioned inside a pipe and an annular outer knife positioned outside the pipe. The inner knife moves from an inner position within the pipe to an outer position where the knife contacts an interior surface of the pipe during the cutting operation. The inner knife also revolves in an annular pattern about the centerline of the pipe such that a cutting edge of the inner knife contacts the entire interior periphery of the pipe during the cutting operation. The annular outer knife has a cutting edge adjacent an exterior surface of the pipe. The outer knife cutting edge surrounds the pipe and is in a position to overlap the inner knife cutting edge. The inner and outer knives move in the axial direction of the pipe during the cutting operation, and the inner knife cooperates with the outer knife to cut the pipe.

18 Claims, 8 Drawing Sheets

APPARATUS FOR CUTTING SPIRAL PIPE

BACKGROUND OF THE INVENTION

The present invention relates generally to an apparatus for cutting spirally formed pipe, and more particularly, to an apparatus for cutting relatively short lengths of pipe having a diameter of one inch or less.

Several machines use inner and outer knives to cut a continuously formed spiral pipe. Such pipe cutting machines are disclosed in my U.S. Pat. No. 4,706,481, 4,823,579 and 4,924,684, issued Nov. 17, 1987, Apr. 25, 1989 and May 15, 1990. In those machines, an inner knife is attached to a boom, and an outer knife is positioned outside the pipe. To cut the pipe, the outer knife is moved into an overlapping relationship with the inner knife. As the pipe rotates and moves axially, the overlapping knives move axially with the pipe and cooperate to cut the pipe. Since the pipe must complete one revolution to be severed, the axial distance the pipe moves during the cutting operation limits the length of pipe which can be cut. By the time the knives return to a begin-cut position, the pipe has already moved too far to cut a relatively short section of pipe. In addition, the pipe undergoes stress during the cutting operation, thus making it more difficult to form the pipe within a forming head and move it axially. On the contrary, the present invention includes an inner knife which is moved radially outward and actively revolved around the interior periphery of the pipe in the same direction the pipe is rotating. As a result, shorter lengths of pipe can be cut because the pipe is severed before it has completed one revolution, and the stress on the pipe is reduced to enhance formation of pipes having a diameter of one inch or less.

U.S. Pat. No. 957,966 (Jenkins) discloses an apparatus which cuts a spirally wound paper tube before it has completed one revolution. In the Jenkins apparatus, an inner support disk is used rather than an inner knife, and the pipe is engaged by moving a plurality of outer knives inward rather than moving an inner knife outward. Also, the present invention includes an annular outer knife which cooperates with the inner knife around the entire circumference of the pipe. In practice, it would be difficult for the Jenkins apparatus to cleanly cut a metal pipe since only outer knives perform the cut and the outer knives independently cut the tube in different locations. It would also be difficult to position more than two knives' outside a pipe having a diameter of one inch or less. Furthermore, the formation of smaller diameter pipes would be more difficult since the outer knives are not actively revolved around the pipe in the same direction the pipe is rotating.

The pipe cutting machines in U.S. Pat. No. 3,268,137 (Martin), U.S. Pat. No. 3,913,430 (van Dijk), and E.P. Patent 353,622 (Harrop) disclose knives which are actively revolved around the pipe to perform a cut. In Martin, an outer cutter is positioned inside a cutter housing, and the cutter housing is positioned inside a cam collar. The cam collar is moved axially to force the cutter housing and outer cutter inward until the cutter engages a pipe manually placed therein. The entire assembly is then rotated to cut the pipe. This machine is not used for cutting continuously formed spiral pipe, and no inner knife is provided.

Van Dijk discloses a device for cutting rings from a pipe. The pipe is manually placed inside a die, inner cutters are moved radially outward by levers to engage an interior surface of the pipe, and the cutters are revolved around the circumference of the pipe. This machine also is not used for cutting continuously formed spiral pipe, and no outer knife is provided. Moreover, it would be difficult to fit two knives and all the connected components shown in Van Dijk inside a pipe having a diameter of one inch or less.

In Harrop, a rotary unit is positioned inside a cam ring, and a pair of outer knives are slidably mounted in the rotary unit. When a desired length of pipe has been reached, the feed of strip and formation of pipe is halted. The rotary unit is moved axially and the outer knives are forced radially inward to engage the pipe. The rotary unit is then rotated and the outer knives cooperate with a mandrel to cut the pipe.

None of these machines cut a continuously formed spiral pipe by using an annular outer knife in cooperation with an inner knife which is moved radially outward and actively revolved around the interior periphery of the pipe. Furthermore, it would be difficult to use the machines mentioned to cut a spiral pipe having a diameter of one inch or less.

SUMMARY OF THE INVENTION

An apparatus for cutting spirally formed pipe includes an inner knife positioned inside a pipe and an annular outer knife positioned outside the pipe. To cut the pipe, the inner knife is moved from an inner position to an outer position where the knife contacts an interior surface of the pipe. The inner knife also revolves in an annular pattern about the centerline of the pipe such that a cutting edge of the inner knife contacts the entire interior periphery of the pipe during the cutting operation. An outer knife has an annular cutting edge which surrounds the pipe and is in a position to overlap the inner knife cutting edge during the cutting operation. In addition, guide means allow the inner and outer knives to move in the axial direction of the pipe.

Preferably, the cutting apparatus includes a first cam member and a second cam member positioned inside a cam housing. The cam housing is connected to a rotatable shaft, and the first cam member is connected to a rod positioned within the shaft. The inner knife is connected to the second cam member and is passively rotatable. Preferably, the annular outer knife is also passively rotatable. To cut the pipe, the rod forces the first cam member axially forward a desired distance inside the cam housing. The second cam member is forced radially outward through a guide opening in the cam housing, and a cutting edge of the inner knife penetrates an interior surface of the pipe. In addition, the cam housing, including the cam members and inner knife, are rotated about the centerline of the pipe by the shaft. As a result, the inner knife revolves in an annular pattern and cooperates with the outer knife to completely cut the pipe.

In a preferred embodiment, axial motion means automatically moves the inner and outer knives in the axial direction of the pipe at substantially the same speed as the pipe when a desired length of pipe is reached. The axial motion means automatically retracts said knives when the inner knife has made a complete revolution around the interior periphery of the pipe, and repeats the cycle during continuous production of spiral pipe. Also in a preferred embodiment, the rod is coordinated with the axial motion means to automatically move in the axial direction of the pipe when a desired length of pipe is reached and move in the opposite direction when the inner knife has made a complete revolution around the interior periphery of the pipe.

The present invention provides significant advantages over other machines which cut continuous spiral pipe. Since the inner knife is actively revolved around the interior periphery of the pipe, the pipe is severed before it has completed one revolution and shorter lengths of pipe can be cut. Furthermore, since the inner knife engages the pipe for a short period of time and revolves in the same direction as the pipe, stress on the pipe is reduced, thus enhancing the formation of pipes having a diameter of one inch or less.

The present invention, together with further objects and advantages, will be best understood by reference to the following detailed description taken in conjunction with the accompanying drawings.

DETAILED DESCRIPTION OF THE PREFERRED EMBODIMENTS

Figure 1:
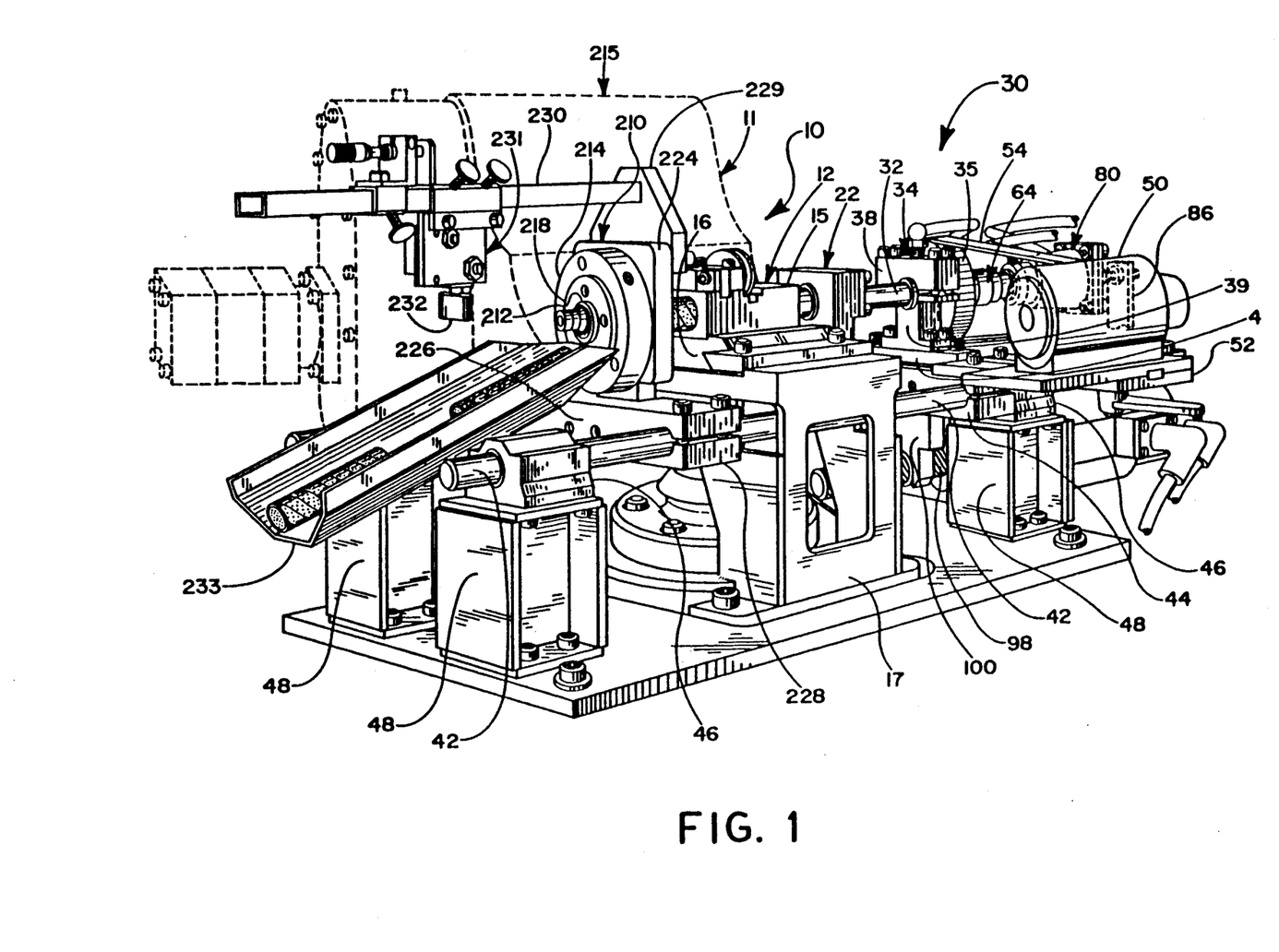
FIG. 1 is a perspective view of the preferred embodiment of the present invention.
Figure 2:
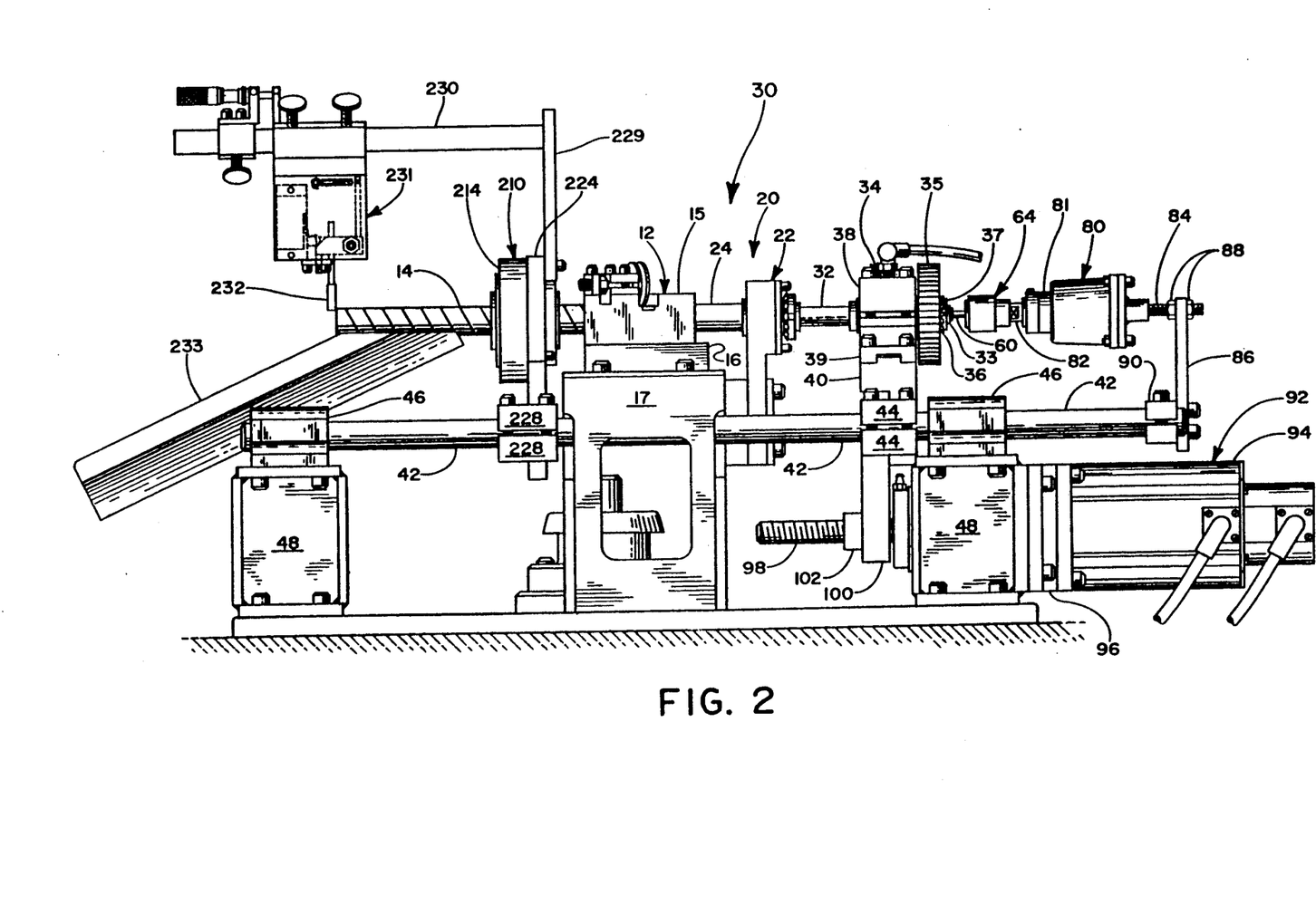
FIG. 2 is a front view of the preferred embodiment of the present invention shown with a motor removed for clarity.

Referring to the drawings, FIGS. 1 and 2 show the improved pipe cutting apparatus 30 of the present invention in combination with a pipe forming apparatus 10. The pipe forming apparatus 10 is described in greater detail in my pending U.S. patent application, Ser. No. 487,608, filed Mar. 2, 1990, the disclosure of which is incorporated herein by reference.

Referring now to FIGS. 1 through 4, the forming apparatus 10 includes a strip forming machine 11, a forming head assembly 12, and a mandrel assembly 20. The forming head assembly 12 and mandrel assembly 20 cooperate to form a metal strip 13 into a spiral pipe 14. The forming head assembly 12 includes a forming head 15 and a base 16 which is detachably secured to a forming head table 17.

A pair of folding rollers 18 are located in the base 16 of the forming head assembly 12, and a lockseam closing roller 19 is positioned on top of the forming head 15. The mandrel assembly 20 includes a vertical holder assembly 22 and a cylindrical mandrel 24. The mandrel 24 is positioned inside the forming head 15 and the vertical holder assembly 24 allows the mandrel 22 to be passively rotatable about its centerline and pivotal in any radial direction.

In the forming operation, the strip forming machine 11 continuously feeds the metal strip 13 into the forming head assembly 12. The strip 13 is driven around the rotatable mandrel 24 and inside the forming head 15 in a helical manner, so that outer edges of the strip are positioned adjacent each other in helical fashion. Folding rollers 18 cooperate to fold the adjacent, mated edges of the helically wound strip. The lockseam roller 19 compresses the folded strip edges against the mandrel 24 to form a tight lockseam 26. As the spiral pipe production continues, the pipe 14 moves out of the forming head 15 in a helical fashion. That is, the pipe 14 moves in its axial direction while it rotates. Although the present cutting apparatus will be described in conjunction with the foregoing forming apparatus, it may be used with any apparatus which continuously forms spiral pipe.

The preferred embodiment of the present pipe cutting apparatus 30 includes many elements of the cutting apparatus disclosed in my U.S. Pat. No. 4,924,684, issued May 15, 1990. The description of the cutting apparatus contained in that patent is incorporated by reference herein and made a part hereof.

A rotatable shaft 32 is positioned inside the mandrel 24 and has an end 33 which extends beyond the end of the mandrel 24. A shaft holder assembly 34 rotatably supports the shaft 32 adjacent the end 33. A pulley 35 is attached to the shaft 32 and is positioned between the shaft holder assembly 34 and end 33 of shaft 32. A lock washer 36 and lock nut 37 are attached to end 33 of the shaft 32 to prevent any axial movement of shaft 32 relative to the shaft holder assembly 34. The shaft holder assembly 34 has an upper section 38 clamped to a lower section 39. The lower section 39 is mounted on an attachment block 40. The attachment block 40 passes between guide bars 42 and is secured to a guide bar connector 44 so that the bar connector 44, attachment block 40, and shaft holder assembly 34 slide axially with the guide bars 42. The guide bars 42 pass through openings in the forming head table 17., and slide through bearing housings 46, which include THK Slide Bearing SC 25 Assemblies. There are four such bearing housings 46, each of which is attached to the top of a mounting leg 48. A motor 50 is mounted on a horizontal support plate 52, and the support plate 52 is attached to one end of guide bar connector 44 adjacent the shaft holder assembly 34. A belt 54 cooperates with a motor shaft 56 and the pulley 35 to actively rotate shaft 32.

A passively rotatable rod 60 is positioned inside shaft 32 and has an end portion 62 supported by a rod holder assembly 64. End portion 62 is threadably attached to a centerpiece 66 positioned inside an annular housing 68. To allow the rod 60 to rotate, thrust bearings 70 surround the centerpiece 66 and are held in place by the annular housing 68 and a cover 72.

A pneumatic cylinder assembly 80 has a cylinder 81, a piston 82 which is threadably attached to the rod holder annular housing 68, and a threaded shaft 84 which extends from an end opposite the piston 82. When air is supplied to the cylinder assembly 80 in one direction, the piston 82 extends out of the cylinder 81 and pushes the entire rod holder assembly 64, including the rod 60, in the axial direction of the pipe 14. When the air to the cylinder is reversed, the piston 82 retracts and pulls the rod holder assembly 64 back to a starting position. The threaded shaft 84 is attached to a vertical plate 86 by opposing adjustment nuts 88. Thus, the axial location of the cylinder assembly 80 relative to the rod holder assembly 64, and the resulting stroke of piston 82, can be adjusted by turning the nuts 88. The vertical plate 86 is attached to a cross member 90 which passes between guide bars 42 and is secured thereto so that the cross member 90 and its connected components slide axially with the guide bars 42.

To move the guide bars 42 and all their connected components in the axial direction of the pipe 14 during the cutting operation, a servo motor assembly 92 is provided. As best shown in FIG. 2, this assembly 92 includes a servo motor 94, a base 96, and a ball screw 98. The base 96 is attached to the mounting legs 48 and the ball screw 98 is secured to a piece of flat stock 100 by a ball nut 102. The flat stock 100 is attached to the central portion of the attachment block 40. During the cutting operation, the motor 94 rotates the ball screw 98 in one direction, and the ball screw cooperates with the ball nut to push the flat stock 100, the attachment block 40, the guide bars 42, and all their connected components, including inner and outer knives, in the axial direction of the pipe 14.

Figure 3:
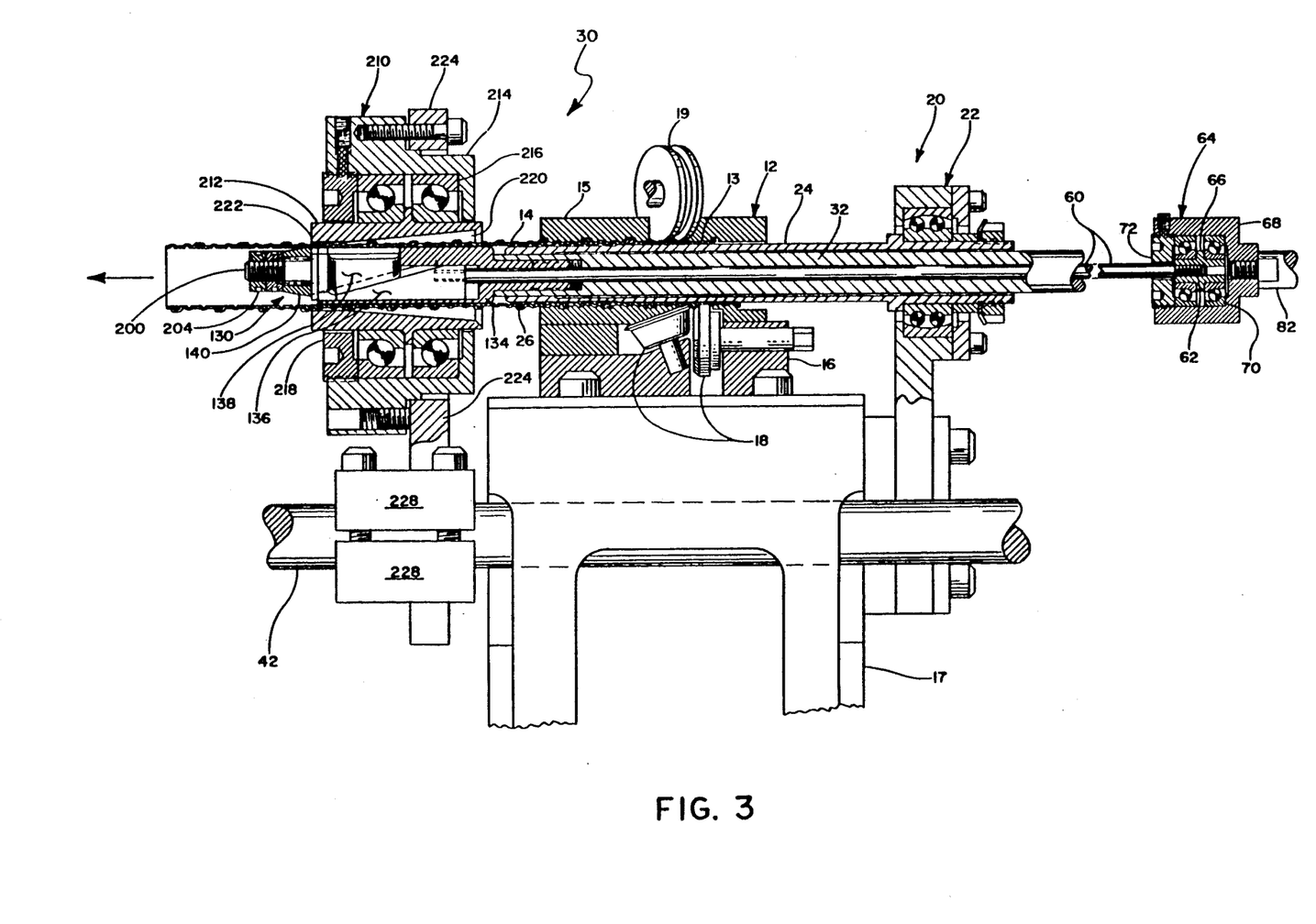
FIG. 3 is a front view, partially in section, of part of the preferred embodiment of the invention.
Figure 4:
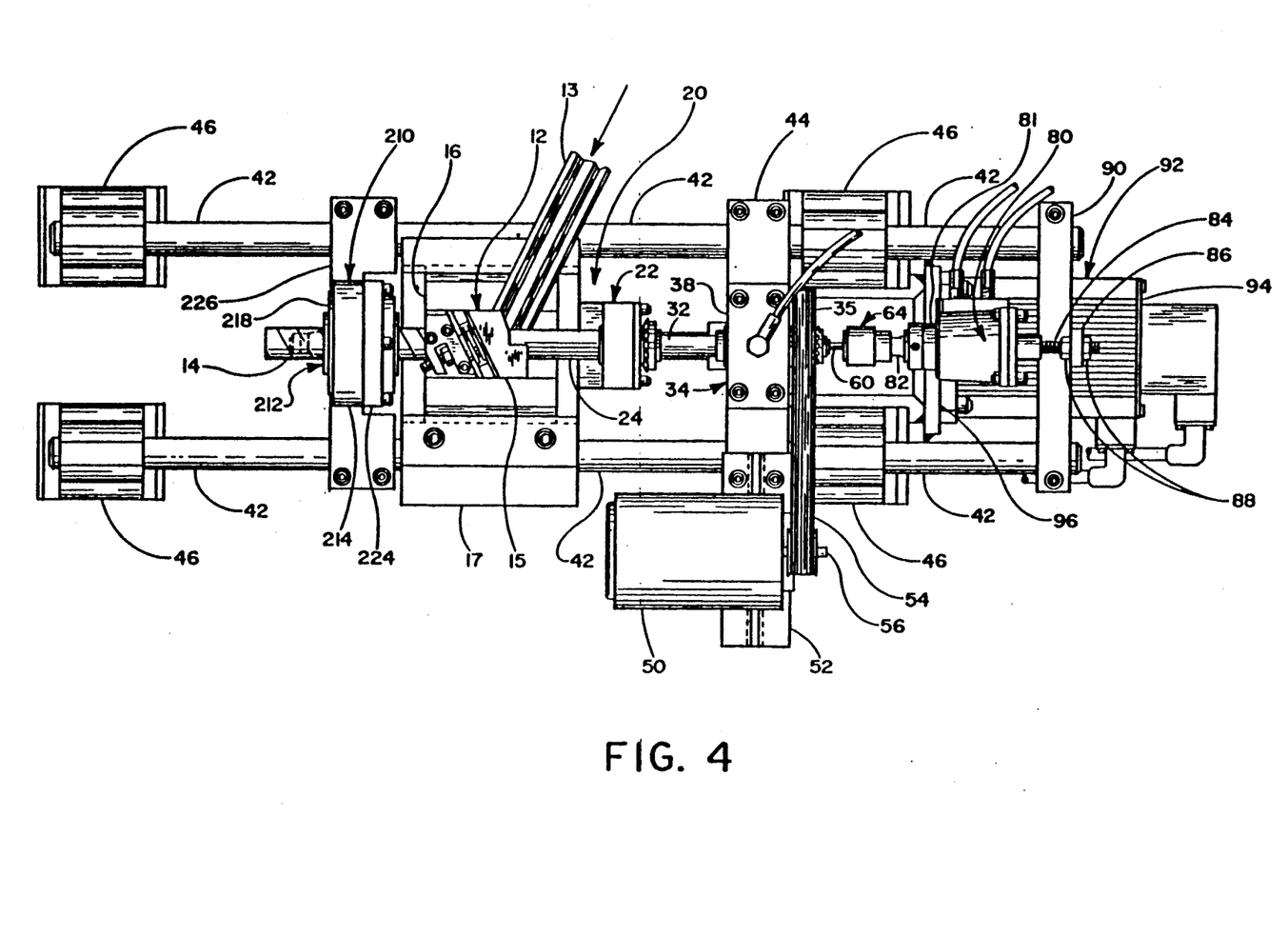
FIG. 4 is a top view of the preferred embodiment of the present invention shown with the paddle switch assembly removed for clarity.
Figures 6A, 6B:
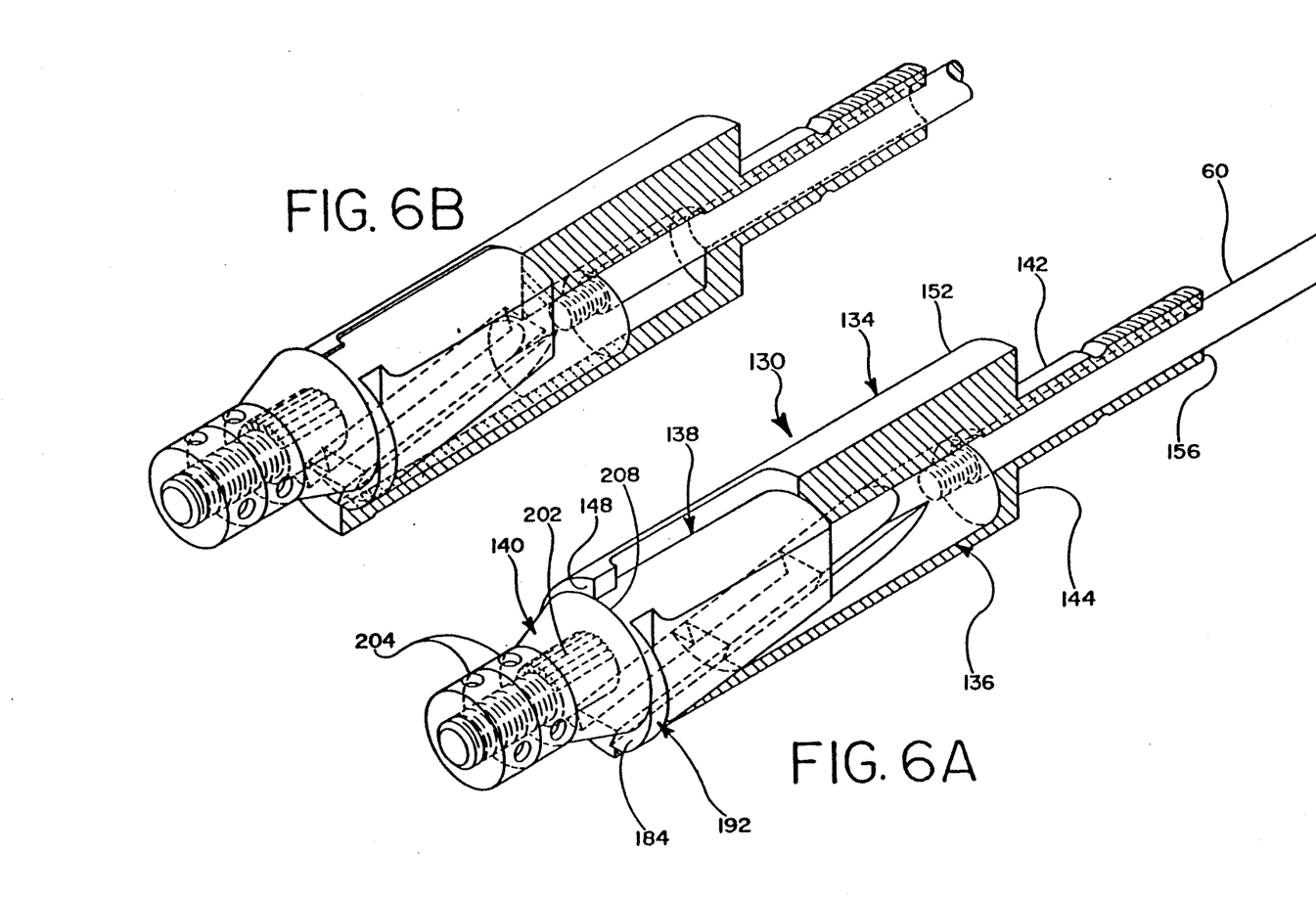
FIG. 6A is a perspective view, partially in section, of the inner cutter assembly showing the inner knife in a disengaged position.
FIG. 6B is a perspective view, partially in section, of the preferred embodiment of the inner cutter assembly showing the, inner knife in an engaged position.
Figure 7A:
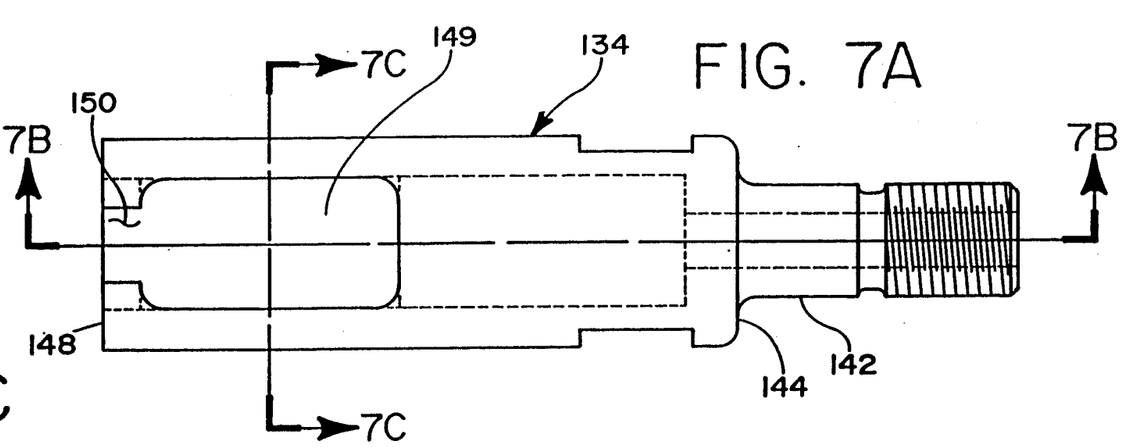
FIG. 7A is a top view of the preferred embodiment of the cam housing.
Figure 7B:
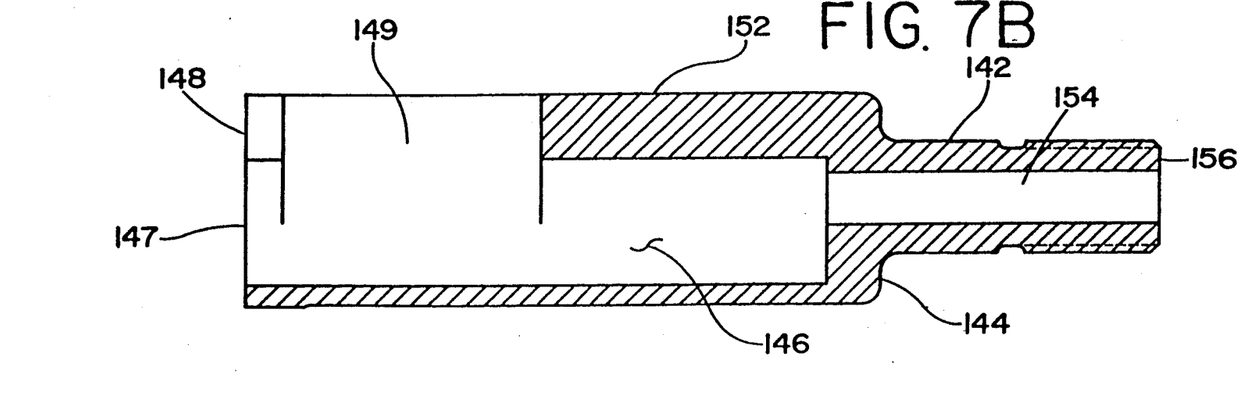
FIG. 7B is a cross-sectional view of the preferred embodiment of the cam housing taken along the line 7B—7B in FIG. 7A.
Figure 7C:
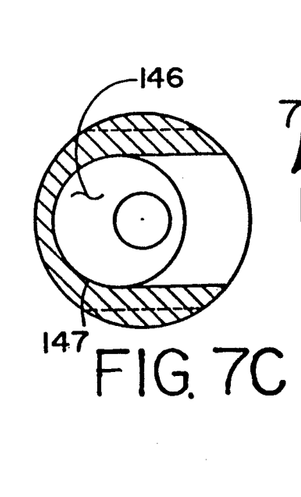
FIG. 7C is a cross-sectional view of the preferred embodiment of the cam housing taken along the line 7C—7C.

Referring now to FIGS. 3 and 6A-B, an inner cutter assembly 130 is positioned inside the pipe 14. The inner cutter assembly 130 includes a cylindrical cam housing 134, a first cam member 136, a second cam member 138, and an inner knife 140.

As best shown in FIGS. 6A-B and 7A-C, cam housing 134 includes an arm 142 which is threadably attached to the shaft 32 and a shoulder 144 which bears against an end of the shaft 32. Since the pipe 14 continues to rotate and move axially after it leaves the forming head 15 and mandrel 24, the outside diameter of cam housing 134 is preferably the same as mandrel 24 to provide an internal support for the pipe 14. Cam housing 134 also includes a cylindrical interior chamber 146 formed therein. The chamber 146 is eccentric relative to the cylindrical housing 134 and terminates in an opening 147 at an end 148 of the housing. A substantially rectangular guide slot 149 and keyway 150 extend perpendicularly through an exterior surface 152 of the housing 134 to the interior chamber 146. Slot 149 is wider than keyway 150 and spaced apart from end 148, and the keyway 150 spans from end 148 to slot 149. A core 154 is also formed in the center of the housing 134 and extends from an end 156 of the arm 142 to the chamber 146.

Although the foregoing description is a preferred embodiment of the cam housing 134, any conventional means for connecting the housing to the shaft can be used, and the housing may be any size and shape as long as it does not interfere with the movement of the pipe. The various chambers and guideways described can be any size and shape as long as they are adapted to guide the movement of the cam members therein. Furthermore, a cam housing need not be used if one of the cam members itself is attached to the shaft 32.

Figures 8A, 9A, 9B, 9C, 10:
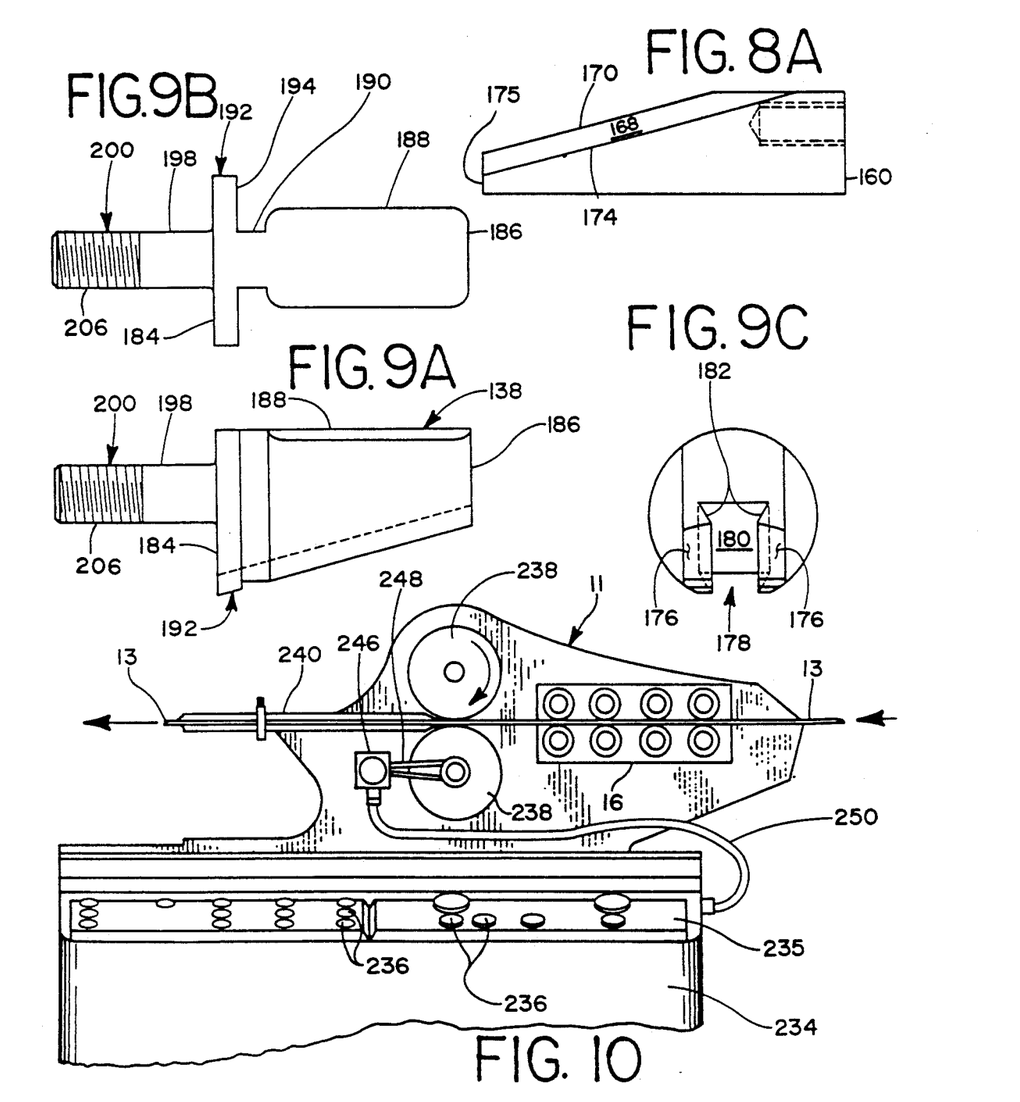
FIG. 8A is a front view of the preferred embodiment of the first cam member.
FIG. 9A is a front view of the preferred embodiment of the second cam member.
FIG. 9B is a top view of the preferred embodiment of the second cam member.
FIG. 9C is a side view of the preferred embodiment of the second cam member.
FIG. 10 is a side view of part of the spiral pipe forming machine which is used with the preferred embodiment of the present invention.
Figure 8B:
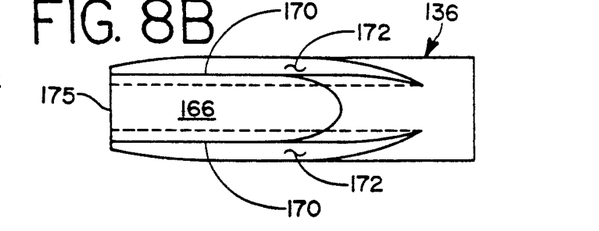
FIG. 8B is a top view of the preferred embodiment of the first cam member.
Figure 8C:
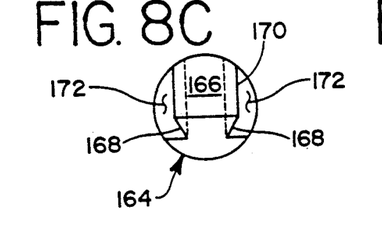
FIG. 8C is a side view of the preferred embodiment of the first cam member.

The first cam member 136 is adapted to slide axially in the interior chamber 146 of the cam housing 134 and cooperate with the second cam member 138. Preferably, an end portion 160 of the first cam member 136 is cylindrical and substantially the same size as the interior chamber 146 of the cam housing 134. The rod 60 is threadably attached to the end portion 160 of cam member 136. Preferably, cam member 136 has an elongated, dovetail portion 164 which engages the second cam member 138. The dovetail portion 164 is defined by a flat center surface 166, side faces 168 depending at an angle inward from side edges 170 of the center surface 166, and flat lateral surfaces 172 extending outward from the lowermost edge 174 of the side faces 168. Each surface of the dovetail portion 164 slopes downward from end portion 160 to end 175, and the lateral surfaces 172 lie in a parallel plane relative to the center surface 166.

The second cam member 138 is adapted to cooperate with the first cam member 136 and slide in the slot 149 and keyway 150 of the cam housing 134. Cam member 138 has flat, bottom lateral surfaces 176 and an elongated interior channel 178 therebetween which slideably mates with the dovetail portion 164 of the first cam member 136. The interior channel 178 is defined by a flat center surface 180 which is substantially the same size as the center surface 166 of the first cam member 136, and side faces 182 which extend inward from the center surface 180 at substantially the same angle as the side faces 168 of the first cam member 136. Each surface of cam member 138 slopes upward from end 184 to end 186, and the bottom lateral surfaces 176 lie in a parallel plane relative to center surface 180. Cam member 138 includes a block portion 188 which mates with the rectangular slot 149 of cam housing 134, a neck portion 190 which mates with the keyway 150 of housing 134, and a head 192 which is wider than keyway 150 and is positioned outside the housing 134 such that an inner surface 194 bears against end 148 of the housing 134.

Referring to FIG. 6A-B and 9A-B, the inner knife 140 is rotatably connected to the head 192 of the second cam member 138. Preferably, inner knife 140 is frustoconically shaped and is mounted on an inner portion 198 of a shaft 200 extending outward from the head 192. Needle bearings 202 surround the inner portion 198 of shaft 200 to provide passive rotation of the inner knife. The inner knife 140 and bearings 202 are held in place by cylindrical lock nuts 204 which are threadably attached to an outer portion 206 of shaft 200.

In operation of the inner cutter assembly 130, rod 60 forces the first cam member 136 axially forward a desired distance in the interior chamber 146 of the cam housing 134. The second cam member 138 is forced radially outward through the slot 149 and keyway 150 in the cam housing, and a cutting edge 208 of the inner knife 140 punctures an interior surface of the pipe 14. The distance the first cam member 136 moves axially, and the resultant distance second cam member 138 and inner knife 140 move radially outward, is set by adjusting the axial location of the pneumatic cylinder assembly 80 relative to the rod holder assembly 64, thus controlling the stroke of the piston 82. In addition, the entire cutter assembly 130 is simultaneously rotated about the centerline of the pipe 14 by the shaft 32, whereby the inner knife 140 revolves in an annular pattern such that the cutting edge 208 contacts the entire interior periphery of pipe 14 during the cutting operation. To cut a spiral pipe 14 having a diameter of one inch or less, the distance between the outermost edge of the inner knife 140 and the opposing surface of the cam housing 134 is less than one inch when the knife 140 is in a disengaged position.

The inner cutter assembly 130 can comprise various configurations adapted to move the inner knife radially outward and revolve it around the interior periphery of the pipe. Any type of cam arrangement that translates axial or rotational motion into radial motion can be used. The inner knife can be attached to the cam member imparting motion or the cam member being acted upon. The cam housing can be eliminated if one of the cam members is attached to an actively rotated shaft. However, the compact arrangement of the present inner cutter assembly is especially useful for cutting pipes having a diameter of one inch or less.

Figure 5:
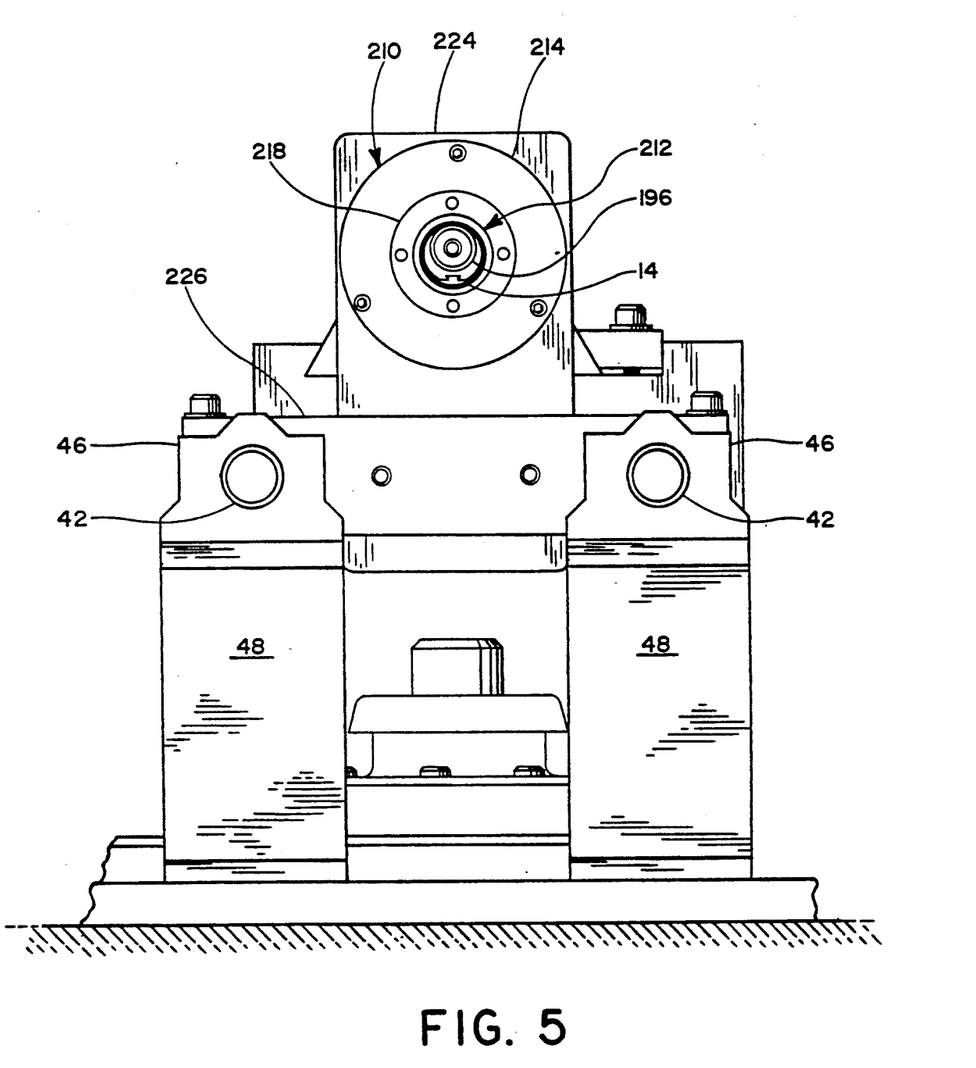
FIG. 5 is a side view of the preferred embodiment of the present invention shown with the paddle switch assembly removed for clarity.

As best shown in FIGS. 3 and 5, an outer cutter assembly 210 surrounds the outside of the pipe 14 adjacent the inner cutter assembly 130. The outer cutter assembly 210 includes a cylindrical, passively rotatable outer knife 212 positioned inside a housing 214. Thrust bearings 216 permit the outer knife 212 to be passively rotatable, that is, rotationally driven by contact with the rotating pipe 14. The bearings 216 are held in place by the housing 214 and a cover 218. The outer knife 212 has a tapered interior chamber 220 and is positioned such that a portion of an annular cutting edge 222 overlaps the inner knife cutting edge 208 as the inner knife 140 revolves around the interior periphery of the pipe 14. The inner diameter of the chamber 220 decreases from one end of the outer knife 212 to the cutting edge 222 to provide an external guide for the pipe 14 during the cutting operation. The outer cutter assembly 210 is held member 226 by a plurality of bolts (not shown). Preferably, the bolts mate with vertical slots to allow vertical adjustment of the outer cutter assembly 210. Cross member 226 passes between guide bars 42 and is secured to a guide bar connector 228 so that the guide bar connector 228, cross member 226, and all their connected components slide axially with the guide bars 42.

A vertical support 229 is connected to the vertical holder 224, and an arm 230 extends from the support 229 past a leading edge of pipe 14. A limit switch assembly 231 is releasably attached to the arm 230 by conventional fastening means such as set screws, nuts and bolts, or the like. The limit switch assembly 231 is positioned a distance away from the vertical holder 224 corresponding to a desired length of pipe to be cut. A paddle 232 extends downward from the limit switch assembly 231 such that a leading edge of the pipe 14 contacts the paddle when the pipe 14 has reached a desired length. A slide 233 is positioned adjacent the vertical holder 224 at an angle so that severed sections of pipe 14 fall into the slide 233 and slide downward to a receptacle (not shown).

Referring now to FIG. 10, the strip forming machine 11 includes a control cabinet 234 and a control panel 235. The control panel 235 contains a plurality of control elements 236, such as knobs, gauges, and dials for controlling and monitoring the operation of the pipe forming apparatus 10 and the pipe cutting apparatus 30.

Drive rollers 238 push a corrugated and edge formed strip 13 through guide plates 240 and into the forming head assembly 12. An electrical encoder 246 is coupled to the lower drive roller 238 of the pipe producing machine 11 by a pulley belt 248. The encoder 246 is adapted to generate pulses corresponding to the number of rotations of the lower drive roller 238. These pulses are transmitted over a cable 250 to a motion control unit (not shown) located inside the control cabinet 234. The motion control unit is programmed to calculate the axial speed of the pipe 14 and the axial travel required to complete a cut. Many elements of the strip forming machine 11 and control elements 236 are described in my U.S. Pat. No. 4,706,481, issued Nov. 17, 1987, and my pending U.S. patent application, Ser. No. 487,608, filed Mar. 2, 1990, the disclosures of which are incorporated herein by reference, and made a part hereof.

Referring now to FIGS. 1-5 and 10, the operation of the preferred embodiment of the pipe cutting apparatus 30 will be described. When the pipe 14 reaches its desired length and the leading edge of the pipe 14 contacts the paddle 232, a signal is sent to the motion control unit to begin the cutting operation. The motion control unit sends a begin-cut signal to the pneumatic cylinder assembly 80 and the servo motor assembly 92.

When the servo motor assembly 92 receives the signal to begin the cutting operation, the servo motor 94 rotates the ball screw 98 in one direction. The ball nut 102 cooperates with the ball screw 98 to push all of the components connected to the guide bars 42, including the inner and outer knives, in the axial direction of the pipe 14 at the same speed as the pipe. The motion control unit continually monitors the axial speed of the pipe 14 and sends that signal to the servo motor assembly 92.

When the pneumatic cylinder assembly 80 receives the begin-cut signal from the motion control unit, air is sent to the cylinder 81 in one direction and piston 82 extends out of the cylinder. Piston 82 pushes the rod 60 in the axial direction of the pipe 14, thus moving the first cam member 136 forward in the interior chamber 146 of the cam housing 134. The second cam member 138 is forced radially outward through the cam housing 134, and the cutting edge 208 of the inner knife 140 punctures the pipe 14 and overlaps the outer knife cutting edge 222. Preferably, the inner cutter assembly 130, including the inner knife 140, is actively rotated within the pipe 14 throughout the forming and cutting operation by the shaft 32 and the motor 50. However, motor 50 can remain idle until a begin-cut signal is received from the motion control unit.

Thus, as the inner and outer knives move axially with the pipe 14, the inner knife 140 revolves in an annular pattern inside the pipe 14 and cooperates with the outer knife 212 to cut the pipe 14. When the inner knife 140 has completed one revolution, the pipe 14 is completely severed and the leading section of pipe 14 falls into the slide 233.

Once the inner knife 140 has completed one revolution, the motion control unit sends an end-cut signal to the servo motor assembly 92 and the pneumatic cylinder assembly 80. The rotation of the ball screw 98 is reversed, and all the components connected to the guide bars 42, including both knives, pull back to the begin-cut position. Also, the air supplied to the cylinder 81 is reversed, and the piston 82 retracts to its initial position. As a result, the second cam member is withdrawn into the cam member housing, and the inner knife is pulled inward from the interior surface of pipe 14 to a non-cutting position. When a new section of pipe 14 reaches a desired length and a leading edge contacts the paddle 232, the entire cutting operation is repeated. Thus, a cutting apparatus is provided which can cut relatively short sections of continuously formed pipe having a diameter of one inch or less.

Although the present invention has been described with reference to preferred embodiments, workers skilled in the art will recognize that changes may be made in form and detail without departing from the spirit and scope of the invention. As such, it is intended that the foregoing detailed description be regarded as illustrative rather than limiting and that it is the following claims, including all equivalents thereof, which are intended to define the scope of the invention.

I claim:

1. An apparatus for cutting continuously formed spiral pipe, wherein the pipe moves in an axial direction and rotates while it is being cut, comprising:
   inner knife means positioned inside said pipe;
   a rod adapted to move the inner knife means from an inner position within the pipe to an outer position where said knife contacts an interior surface of the pipe during a cutting operation;
   a rotatable shaft adapted to revolve the inner knife means in an annular pattern about the centerline of the pipe such that a cutting edge of the inner knife means contacts the entire interior periphery of the pipe during the cutting operation;
   an annular, outer knife positioned outside said pipe and having a cutting edge adjacent an exterior surface of the pipe, said cutting edge surrounding the pipe and being in a position to overlap the inner knife cutting edge;
   axial motion means for moving said inner knife means, rod, shaft, and outer knife in the axial direction of the pipe at substantially the same speed as the pipe during the cutting operation; and
   guide means for allowing the inner knife means, rod, shaft, and the outer knife to move in the axial direction of the pipe during the cutting operation, whereby the inner knife means cooperates with the outer knife to cut the pipe.

2. The apparatus of claim 1, further comprising cam means adapted to be connected to the inner knife means, said cam means cooperating to move the inner knife means from an inner position to an outer position whereby said knife contacts an interior surface of the pipe during the cutting operation.

3. The apparatus of claim 2, wherein the cam means comprises a first cam member and a second cam member, the first cam member being connected at one end to the inner knife means and at the other end to the rod, whereby said rod moves in an axial direction and forces the first cam member and inner knife means outward.

4. The apparatus of claim 2, wherein the cam means comprises a first cam member and a second cam member movable in a radial direction, the inner knife means being rotatably connected to the second cam member, said cam members cooperating such that movement of the first cam member causes the second cam member and inner knife to move in a radial direction toward an interior surface of the pipe, whereby a cutting edge of the inner knife contacts the interior surface of the pipe during a cutting operation.

5. The apparatus of claim 4, wherein the cam members are positioned inside a cam housing which is adapted to rotate within the pipe, the cam housing having means for guiding the cam members so that the inner knife means does not shift tangentially while it is revolving around the interior periphery of the pipe.

6. The apparatus of claim 5, wherein the inner knife means and outer knife are passively rotatable about their respective centerlines.

7. An apparatus for cutting continuously formed spiral pipe, wherein the pipe moves in an axial direction and rotates while it is being cut, comprising:
   an inner cutter assembly positioned inside the pipe, said assembly including a first cam member movable in an axial direction by a rod, a second cam member movable in a radial direction, and an inner knife rotatably connected to the second cam member, said cam members cooperating such that an axial force exerted on the first cam member causes the second cam member and inner knife to move in a radial direction toward an interior surface of the pipe, whereby a cutting edge of the inner knife contacts the interior surface of the pipe during a cutting operation;
   a rotatable shaft adapted to revolve the inner cutter assembly about the centerline of the pipe such that a cutting edge of the inner knife contacts the entire interior periphery of the pipe during a cutting operation;
   an annular, passively rotatable, outer knife positioned outside said pipe and having a cutting edge adjacent an exterior surface of the pipe, said cutting edge surrounding the pipe and being in a position to overlap the inner knife cutting edge;
   axial motion means for moving said inner cutter assembly, rod, shaft, and outer knife in the axial direction of the pipe at substantially the same speed as the pipe during the cutting operation, and for retracting said inner cutter assembly, rod, shaft, and outer knife in the opposite axial direction after the inner knife makes a complete revolution around the interior periphery of the pipe and is withdrawn in a radial direction toward the center of the pipe; and
   guide means for allowing the inner cutter assembly, rod, shaft, and the outer knife to move in the axial direction of the pipe during the cutting operation, whereby the inner knife cooperates with the outer knife to cut the pipe.

8. The apparatus of claim 7, further comprising a cylindrical cam housing having an elongated interior chamber therein and a guide opening perpendicular to said chamber, the cam members being positioned in said chamber and the housing being connected at one end to the shaft, whereby axial movement of the first cam member forces the second cam member and inner knife means radially outward through the guide opening.

9. The apparatus of claim 8, wherein the shaft has a core and is positioned inside a mandrel around which the pipe is formed, and the means for moving the inner knife means outward further comprises a rod slidably fitting in the core, one end of the rod being connected to the first cam member.

10. A cutting apparatus for use with a spiral pipe forming apparatus including a mandrel positioned inside a forming head, whereby a metal strip enters adjacent one end of the forming head, rotates around the mandrel, moves in an axial direction, and is formed into a spiral pipe, the spiral pipe exiting at the other end of the forming head and continuing to rotate around the mandrel and move in an axial direction away from the forming head, the cutting apparatus comprising:
- a rotatable shaft positioned inside the pipe and having a core therein;
- a cylindrical cam housing connected at one end to said shaft, the cam housing having an elongated interior chamber therein and a guide opening perpendicular to said chamber;
- first and second cam members positioned in the cam housing chamber, the first cam member being movable in an axial direction and the second cam member being movable in a radial direction, whereby axial movement of the first cam member forces the second cam member radially outward through the cam housing guide opening;
- an inner knife rotatably connected to the second cam member, whereby the inner knife is moved in a radial direction toward an interior surface of the pipe and a cutting edge of the inner knife contacts the interior surface of the pipe during a cutting operation;
- a rod slidably fitting in the shaft core, the rod being connected at one end to the first cam member and at the other end to means for moving said rod axially;
- means for rotating the shaft, whereby the inner knife revolves in an annular pattern about the centerline of the pipe such that a cutting edge of the inner knife contacts the entire interior periphery of the pipe during the cutting operation;
- an annular, passively rotatable, outer knife positioned outside the pipe and having a cutting edge adjacent an exterior surface of the pipe, said cutting edge surrounding the pipe and being in a position to overlap the inner knife cutting edge;
- guide means for allowing the inner and outer knives to move in the axial direction of the pipe during the cutting operation, and for allowing said knives to retract in the opposite direction after the inner knife makes a complete revolution around the interior periphery of the pipe; and
- axial motion means for moving the inner and outer knives in the axial direction of the pipe at substantially the same speed as the pipe during the cutting operation, and retracting said knives in the opposite direction after the inner knife makes a complete revolution around the interior periphery of the pipe.

11. The apparatus of claim 10, wherein the interior chamber is cylindrical, the guide opening comprises a substantially rectangular slot adjacent a forward end of the housing and a keyway spanning from said forward end to the rectangular slot, the first cam member has a cylindrical aft end portion substantially the same size as the interior chamber, and the second cam member has a block portion which mates with the rectangular slot, a neck portion which mates with the keyway, and a head which is wider than the keyway and positioned outside the housing such that an inner surface thereof bears against the forward end of the housing.

12. The apparatus of claim 11, wherein the first cam member has an aft end connected to the rod and a top inclined surface which slopes downward from said aft end to a forward end thereof, said top inclined surface having edges which define first engagement means, and the second cam member has a bottom inclined surface which slopes upward from a forward end to an aft end thereof, said bottom inclined surface having edges defining second engagement means which slidably mate with the first engagement means of the first cam member.

13. The apparatus of claim 10, wherein the outer knife is cylindrical and has a tapered interior chamber such that the inner diameter of the chamber decreases from one end of the outer knife to the annular cutting edge thereof to provide an external guide for the pipe during the cutting operation.

14. The apparatus of claim 10, wherein the axial motion means automatically moves the inner and outer knives in the axial direction of the pipe at substantially the same speed as the pipe when a desired length of pipe is reached, retracts said knives when the inner knife has made a complete revolution around the interior periphery of the pipe, and repeats the cycle during continuous production of spiral pipe.

15. The apparatus of claim 14, wherein the rod is automatically moved in the axial direction of the pipe when a desired length of pipe is reached and automatically moved in the opposite direction when the inner knife has made a complete revolution around the interior periphery of the pipe.

16. A cutting apparatus for use with a spiral pipe forming apparatus including a mandrel positioned inside a forming head, whereby a metal strip enters adjacent an aft end of the forming head, rotates around the mandrel, moves in an axial direction, and is formed into a spiral pipe, the spiral pipe exiting at a forward end of the forming head and continuing to rotate around the mandrel and move in an axial direction away from the forming head, the cutting apparatus comprising:
- a rotatable shaft positioned inside the mandrel, said shaft having a forward end, an aft end extending beyond an end of the mandrel, and a core in the center thereof;
- a rod slidably fitting in the shaft core, the rod having a forward end and an aft end which extends beyond the aft end of the shaft and is connected to means for moving said rod axially;
- a cylindrical cam housing having a forward end, an aft end connected to the shaft, an exterior surface, a longitudinal interior chamber terminating in an opening at the forward end, and a substantially rectangular slot and keyway which extend perpendicularly through the exterior surface of the housing to said interior chamber, the slot being wider than the keyway and adjacent the forward end of the housing, and the keyway spanning from said forward end to the rectangular slot;
- a first elongated cam member adapted to slide axially in the interior chamber of the cam housing, said cam member having an aft end connected to the rod and a top inclined surface which slopes downward from said aft end to a forward end thereof, said inclined surface having edges which define first engagement means;
- a second elongated cam member having a block portion which mates with the rectangular slot, a neck portion which mates with the keyway, a head which is wider than the keyway and is positioned outside the housing such that an inner surface thereof bears against the forward end of the housing, and a bottom inclined surface which slopes upward from a forward end to an aft end thereof, said bottom inclined surface having edges defining second engagement means which slidably mate with the first engagement means of the first cam member;

an inner knife rotatably connected to an outside surface of the second cam member head;

means for moving the rod axially, whereby the first cam member moves axially forward and the second cam member moves radially outward, whereby a cutting edge of the inner knife contacts an interior surface of the pipe during the cutting operation;

means for rotating the shaft, said means adapted to cooperate with the aft end of said shaft, whereby the inner knife revolves in an annular pattern about the centerline of the pipe such that a cutting edge of the inner knife contacts the entire interior periphery of the pipe during the cutting operation;

an annular, passively rotatable, outer knife positioned outside the pipe and having a cutting edge adjacent an exterior surface of the pipe, said cutting edge surrounding the pipe and being in a position to overlap the inner knife cutting edge;

guide means for allowing the inner and outer knives to move in the axial direction of the pipe at substantially the same speed as the pipe during the cutting operation, and for allowing said knives to retract in the opposite direction after the inner knife makes a complete revolution around the interior periphery of the pipe; and axial motion means which automatically moves the inner and outer knives in the axial direction of the pipe at substantially the same speed as the pipe when a desired length of pipe is reached, retracts said knives when the inner knife has made a complete revolution around the interior periphery of the pipe, and repeats the cycle during continuous production of spiral pipe.

17. The apparatus of claim 16, wherein the cam housing interior chamber is cylindrical and the first elongated cam member has a cylindrical aft end portion substantially the same size as said chamber for axial guidance.

18. The apparatus of claim 17, wherein the rod is automatically moved in the axial direction of the pipe when a desired length of pipe is reached and automatically moved in the opposite direction when the inner knife has made a complete revolution around the interior periphery of the pipe.

* * * * *

UNITED STATES PATENT AND TRADEMARK OFFICE
CERTIFICATE OF CORRECTION

PATENT NO. : 5,193,374
DATED : March 16, 1993
INVENTOR(S) : Wilhelmus P. H. Castricum It is certified that error appears in the above-indentified patent and that said Letters Patent is hereby corrected as shown below:

In column 1, line 49, delete "knives'" and substitute --knives-- therefor.

In column 3, line 38, after "the" delete ",".

In column 4, line 60, after "17" delete ".".

In column 6, line 47, delete "FIG." and substitute --FIGS.-- therefor.

UNITED STATES PATENT AND TRADEMARK OFFICE
CERTIFICATE OF CORRECTION

PATENT NO. : 5,193,374
DATED : March 16, 1993
INVENTOR(S) : Wilhelmus P. H. Castricum It is certified that error appears in the above-indentified patent and that said Letters Patent is hereby corrected as shown below:

In column 7, line 40, after "held" insert --in a vertical holder 224 which is attached to a cross--.

Signed and Sealed this

Twenty-first Day of March, 1995

Attest:

BRUCE LEHMAN

*Attesting Officer*  *Commissioner of Patents and Trademarks*